United States Patent
Patil et al.

(10) Patent No.: US 11,928,703 B2
(45) Date of Patent: Mar. 12, 2024

(54) SYSTEM AND METHOD FOR DYNAMIC PROMOTIONAL OFFERS AT AN AUTOMATED TELLER MACHINE

(71) Applicant: Visa International Service Association, San Francisco, CA (US)

(72) Inventors: Prajakta Patil, Livermore, CA (US); Michael Kenji Mori, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 115 days.

(21) Appl. No.: 17/425,798

(22) PCT Filed: Feb. 4, 2019

(86) PCT No.: PCT/US2019/016498
§ 371 (c)(1),
(2) Date: Jul. 26, 2021

(87) PCT Pub. No.: WO2020/162874
PCT Pub. Date: Aug. 13, 2020

(65) Prior Publication Data
US 2022/0301001 A1    Sep. 22, 2022

(51) Int. Cl.
*G06Q 30/02*    (2023.01)
*G06Q 30/0207*    (2023.01)

(52) U.S. Cl.
CPC ..... *G06Q 30/0236* (2013.01); *G06Q 30/0224* (2013.01); *G06Q 30/0237* (2013.01)

(58) Field of Classification Search
CPC ........... G06Q 30/0236; G06Q 30/0224; G06Q 30/0237; G06Q 30/0207; G07F 17/0035
See application file for complete search history.

(56) References Cited

U.S. PATENT DOCUMENTS 7,039,600 B1    5/2006  Meek et al.
7,945,585 B1    5/2011  Sorkin et al.
(Continued)

FOREIGN PATENT DOCUMENTS

KR    20000037125 A    7/2000

OTHER PUBLICATIONS

Atmmarketplace on target with ATM advertising, Sep. 10, 2002, https://www.atmmarketplace.com/articles/on-target-with-atm-advertising/, pp. 1-5 (Year: 2002).*

(Continued)

*Primary Examiner* — John Van Bramer
(74) *Attorney, Agent, or Firm* — The Webb Law Firm

(57) ABSTRACT

Described are a system and method for dynamic promotional offers during user interaction at an automated teller machine (ATM). The method includes receiving, at the ATM, a transaction request based on an account identifier associated with an account of a user. The method also includes determining, based on the account identifier, that the account of the user was issued by an issuer that is different than an acquirer associated with the ATM. The method further includes, in response to determining that the account was issued by the issuer, generating, with at least one processor, an authorization request message based on the transaction request and the account identifier. The method further includes receiving an authorization response message comprising embedded user profile data and generating, on a display of the ATM, at least one offer based on the embedded user profile data.

8 Claims, 5 Drawing Sheets

(56) References Cited

U.S. PATENT DOCUMENTS

| | | |
|---|---|---|
| 9,342,835 B2 | 5/2016 | Fordyce, III et al. |
| 2008/0275771 A1* | 11/2008 | Levine ............... G06Q 30/0273 705/16 |
| 2011/0087550 A1* | 4/2011 | Fordyce, III ......... G06Q 20/384 705/14.66 |
| 2011/0137689 A1* | 6/2011 | Chua .................. G06Q 20/1085 705/5 |
| 2012/0018510 A1 | 1/2012 | Gardner |
| 2013/0218641 A1 | 8/2013 | Graham et al. |

OTHER PUBLICATIONS

Quinn, "ATM Advertising Patented by Diebold", IPWatchdog, 2008, p. 1.

\* cited by examiner

SYSTEM AND METHOD FOR DYNAMIC PROMOTIONAL OFFERS AT AN AUTOMATED TELLER MACHINE

CROSS-REFERENCE TO RELATED APPLICATION

This application is the United States national phase of International Application No. PCT/US2019/016498 filed Feb. 4, 2019, the entire disclosure of which is hereby incorporated by reference in its entirety.

BACKGROUND

Technical Field

Disclosed embodiments or aspects relate generally to customized automated teller machine (ATM) interfaces and interactivity and, in one particular embodiment or aspect, to a system and method for dynamic promotional offers during user interaction at an ATM.

Technical Considerations

Customizing ATM functionality for user interaction is often limited to the data immediately available to the ATM acquirer (e.g., a banking institution), and user-specific data may not be known to the ATM acquirer unless the ATM acquirer is also the issuer of the user's payment device. A user that has a payment device associated with an issuer that is different from the ATM acquirer may be considered an "off-us" ATM user. By way of further example, a user with a payment device issued by a first bank that withdraws money from an ATM provided by a second bank would be engaging in an off-us ATM transaction. In such a scenario, the ATM acquirer does not have a preexisting relationship with the transacting user. The ATM acquirer simply facilitates the processing of the off-us ATM transaction by routing the transaction to the issuer via a transaction service provider system, and the ATM acquirer may charge fees for doing so. When an off-us ATM user interacts with an ATM that is not associated with their payment device issuer, the ATM may be unable to access the ATM user's transaction history, personal account information, payment device data, or other useful personal data. Without data associated with the ATM user, either specific to the ATM user or as a member of a group, the ATM's functionality for user interaction is greatly limited, preventing user customization, the display of targeted offers, and user-specific services.

Therefore, there is a need in the art for a technical solution to enable ATM process flow customization based on data related to off-us ATM users, conducted in real-time to ATM transaction processing.

SUMMARY

Accordingly, and generally, provided is an improved system and method for dynamic promotional offers during user interaction at an automated teller machine (ATM). Preferably, provided is a system and method for receiving a transaction request based on an account identifier associated with an account of a user. Preferably, provided is a system and method for determining that the account of the user was issued by an issuer that is different than an acquirer associated with the ATM, and generating an authorization request message based on the transaction request and the account identifier. Preferably, provided is a system and method for receiving an authorization response message including embedded user profile data and generating at least one offer based on the embedded user profile data.

According to non-limiting embodiments or aspects, provided is a computer-implemented method for dynamic promotional offers during user interaction at an automated teller machine (ATM). The method includes receiving, with at least one processor, a transaction request based on an account identifier associated with an account of a user. The method also includes determining, with at least one processor and based on the account identifier, that the account of the user was issued by an issuer that is different than an acquirer associated with the ATM. The method further includes, in response to determining that the account was issued by the issuer, generating, with at least one processor, an authorization request message based on the transaction request and the account identifier. The method further includes receiving, with at least one processor, an authorization response message including embedded user profile data. The method further includes generating or causing a generation of, on a display of the ATM, at least one offer based on the embedded user profile data.

In non-limiting embodiments or aspects, the at least one offer may be an offer for the user to purchase a good or service from at least one third party merchant for a transaction amount. The method may include, in response to an acceptance of the at least one offer by the user, generating, with at least one processor, a transaction authorization request from the ATM to debit a transaction account of the user and credit a transaction account of the at least one third party merchant.

In non-limiting embodiments or aspects, the authorization request message may include a custom user data request. The embedded user profile data may include offer-determinative user data associated with the user. The offer-determinative user data may include at least one user attribute of a transaction history profile of the user.

In non-limiting embodiments or aspects, the authorization request message may include a general user data request. The embedded user profile data may include offer-determinative user data associated with the user. The offer-determinative user data may include an offer group associated with the user.

According to non-limiting embodiments or aspects, provided is a system for dynamic promotional offers during user interaction at an automated teller machine (ATM). The system includes a server having at least one processor. The server is programmed and/or configured to receive a transaction request based on an account identifier associated with an account of a user. The server is also programmed and/or configured to determine, based on the account identifier, that the account of the user was issued by an issuer that is different than an acquirer associated with the ATM. The server is further programmed and/or configured to, in response to determining that the account was issued by the issuer, generate an authorization request message based on the transaction request and the account identifier. The server is further programmed and/or configured to receive an authorization response message including embedded user profile data. The server is further programmed and/or configured to generate or cause a generation of, on the display of the ATM, at least one offer based on the embedded user profile data.

In non-limiting embodiments or aspects, the at least one offer may be an offer for the user to purchase a good or service from at least one third party merchant for a transaction amount. The server may be further programmed and/or configured to, in response to an acceptance of the at least one offer by the user, generate a transaction authorization request to debit a transaction account of the user and credit a transaction account of the at least one third party merchant.

In non-limiting embodiments or aspects, the authorization request message may include a custom user data request, the embedded user profile data includes offer-determinative user data associated with the user, and the offer-determinative user data includes at least one user attribute of a transaction history profile of the user.

In non-limiting embodiments or aspects, the authorization request message may include a general user data request. The embedded user profile data may include offer-determinative user data associated with the user. The offer-determinative user data may include an offer group associated with the user.

According to non-limiting embodiments or aspects, provided is a computer-implemented method for dynamic promotional offers during user interaction at an automated teller machine (ATM). The method includes (a) receiving, with at least one processor, transaction data associated with a plurality of transactions between a plurality of users and a plurality of merchant point-of-sale (POS) terminals during a sample time period. The method also includes (b) associating, with at least one processor, based at least partly on the transaction data and using a user classification model, each user of the plurality of users with at least one offer group. The method further includes (c) generating, with at least one processor, based at least partly on the transaction data, a transaction history profile for each user of the plurality of users including a plurality of attributes associated with transactions completed by the user during the sample time period. The method further includes (d) receiving, with at least one processor, a request from the ATM or an acquirer associated with the ATM for offer-determinative user data, the request including an account identifier associated with a user of the plurality of users that is interacting with the ATM. The method further includes (e) embedding, with at least one processor, the offer-determinative user data associated with the user in an authorization response message based on a transaction request from the user interacting with the ATM. The method further includes (f) communicating, with at least one processor, the authorization response message to the ATM or the acquirer, the authorization response message configured to cause the ATM to display at least one offer to the user for acceptance or rejection of the at least one offer at the ATM.

In non-limiting embodiments or aspects, the request from the ATM or the acquirer may be a custom user data request. The offer-determinative user data may include at least one user attribute of the transaction history profile of the user.

In non-limiting embodiments or aspects, the request from the ATM or the acquirer may be a general user data request. The offer-determinative user data may include an offer group of the at least one offer group associated with the user.

In non-limiting embodiments or aspects, the method may include storing, with at least one processor and in at least one database, offer data associated with the at least one offer that is input by at least one third party merchant. Step (b) may include associating the user with an offer group for the at least one offer based on the transaction history profile of the user. The offer-determinative user data may further include the offer data.

In non-limiting embodiments or aspects, the offer data may include a location of the at least one third party merchant. Step (b) may be based at least partly on a location of the ATM with respect to the location of the at least one third party merchant.

In non-limiting embodiments or aspects, the at least one offer may be an offer for the user to purchase a good or service from the at least one third party merchant for a transaction amount. The method may include, in response to an acceptance of the at least one offer by the user, receiving, with at least one processor, a transaction authorization request from the ATM or the acquirer to debit a transaction account of the user and credit a transaction account of the at least one third party merchant.

According to non-limiting embodiments or aspects, provided is a system for dynamic promotional offers during user interaction at an automated teller machine (ATM). The system includes a server including at least one processor. The server is programmed and/or configured to (a) receive transaction data associated with a plurality of transactions between a plurality of users and a plurality of merchant POS terminals during a sample time period. The server is also programmed and/or configured to (b) associate, based at least partly on the transaction data and using a user classification model, each user of the plurality of users with at least one offer group. The server is further programmed and/or configured to (c) generate, based at least partly on the transaction data, a transaction history profile for each user of the plurality of users including a plurality of attributes associated with transactions completed by the user during the sample time period. The server is further programmed and/or configured to (d) receive a request from the ATM or an acquirer associated with the ATM for offer-determinative user data, the request including an account identifier associated with a user of the plurality of users that is interacting with the ATM. The server is further programmed and/or configured to (e) embed the offer-determinative user data associated with the user in an authorization response message based on a transaction request from the user interacting with the ATM. The server is further programmed and/or configured to (f) communicate the authorization response message to the ATM or the acquirer, the authorization response message configured to cause the ATM to display at least one offer to the user for acceptance or rejection of the at least one offer at the ATM.

In non-limiting embodiments or aspects, the request from the ATM or the acquirer may be a custom user data request. The offer-determinative user data may include at least one user attribute of the transaction history profile of the user.

In non-limiting embodiments or aspects, the request from the ATM or the acquirer may be a general user data request. The offer-determinative user data may include an offer group of the at least one offer group associated with the user.

In non-limiting embodiments or aspects, the server may be further programmed and/or configured to store, in at least one database, offer data associated with the at least one offer that is input by at least one third party merchant. Step (b) may include associating the user with an offer group for the at least one offer based on the transaction history profile of the user. The offer-determinative user data may further include the offer data.

In non-limiting embodiments or aspects, the offer data may include a location of the at least one third party merchant. Step (b) may be based at least partly on a location of the ATM with respect to the location of the at least one third party merchant.

In non-limiting embodiments or aspects, the at least one offer may be an offer for the user to purchase a good or service from the at least one third party merchant for a transaction amount. The system may be further programmed and/or configured to, in response to an acceptance of the at least one offer by the user, receive a transaction authorization request from the ATM or the acquirer to debit a transaction account of the user and credit a transaction account of the at least one third party merchant.

Further non-limiting embodiments or aspects of the present disclosure will be set forth in the following numbered clauses:

Clause 1: A computer-implemented method for dynamic promotional offers during user interaction at an automated teller machine (ATM), the method comprising: receiving, with at least one processor, a transaction request based on an account identifier associated with an account of a user; determining, with at least one processor and based on the account identifier, that the account of the user was issued by an issuer that is different than an acquirer associated with the ATM; in response to determining that the account was issued by the issuer, generating, with at least one processor, an authorization request message based on the transaction request and the account identifier; receiving, with at least one processor, an authorization response message comprising embedded user profile data; and generating or causing a generation of, on a display of the ATM, at least one offer based on the embedded user profile data.

Clause 2: The method of clause 1, wherein the at least one offer is an offer for the user to purchase a good or service from at least one third party merchant for a transaction amount, the method further comprising, in response to an acceptance of the at least one offer by the user, generating, with at least one processor, a transaction authorization request from the ATM to debit a transaction account of the user and credit a transaction account of the at least one third party merchant.

Clause 3: The method of clause 1 or 2, wherein the authorization request message comprises a custom user data request, the embedded user profile data comprises offer-determinative user data associated with the user, and the offer-determinative user data comprises at least one user attribute of a transaction history profile of the user.

Clause 4: The method of any of clauses 1-3, wherein the authorization request message comprises a general user data request, the embedded user profile data comprises offer-determinative user data associated with the user, and the offer-determinative user data comprises an offer group associated with the user.

Clause 5: A system for dynamic promotional offers during user interaction at an automated teller machine (ATM), the system comprising a server comprising at least one processor, the server being programmed and/or configured to: receive a transaction request based on an account identifier associated with an account of a user; determine, based on the account identifier, that the account of the user was issued by an issuer that is different than an acquirer associated with the ATM; in response to determining that the account was issued by the issuer, generate an authorization request message based on the transaction request and the account identifier; receive an authorization response message comprising embedded user profile data; and generate or cause a generation of, on a display of the ATM, at least one offer based on the embedded user profile data.

Clause 6: The system of clause 5, wherein the at least one offer is an offer for the user to purchase a good or service from at least one third party merchant for a transaction amount, the server being further programmed and/or configured to, in response to an acceptance of the at least one offer by the user, generate a transaction authorization request to debit a transaction account of the user and credit a transaction account of the at least one third party merchant.

Clause 7: The system of clause 5 or 6, wherein the authorization request message comprises a custom user data request, the embedded user profile data comprises offer-determinative user data associated with the user, and the offer-determinative user data comprises at least one user attribute of a transaction history profile of the user.

Clause 8: The system of any of clauses 5-7, wherein the authorization request message comprises a general user data request, the embedded user profile data comprises offer-determinative user data associated with the user, and the offer-determinative user data comprises an offer group associated with the user.

Clause 9: A computer-implemented method for dynamic promotional offers during user interaction at an automated teller machine (ATM), the method comprising: (a) receiving, with at least one processor, transaction data associated with a plurality of transactions between a plurality of users and a plurality of merchant point-of-sale terminals during a sample time period; (b) associating, with at least one processor, based at least partly on the transaction data and using a user classification model, each user of the plurality of users with at least one offer group; (c) generating, with at least one processor, based at least partly on the transaction data, a transaction history profile for each user of the plurality of users comprising a plurality of attributes associated with transactions completed by the user during the sample time period; (d) receiving, with at least one processor, a request from the ATM or an acquirer associated with the ATM for offer-determinative user data, the request comprising an account identifier associated with a user of the plurality of users that is interacting with the ATM; (e) embedding, with at least one processor, the offer-determinative user data associated with the user in an authorization response message based on a transaction request from the user interacting with the ATM; and (f) communicating, with at least one processor, the authorization response message to the ATM or the acquirer, the authorization response message configured to cause the ATM to display at least one offer to the user for acceptance or rejection of the at least one offer at the ATM.

Clause 10: The method of clause 9, wherein the request from the ATM or the acquirer is a custom user data request, and the offer-determinative user data comprises at least one user attribute of the transaction history profile of the user.

Clause 11: The method of clause 9 or 10, wherein the request from the ATM or the acquirer is a general user data request, and the offer-determinative user data comprises an offer group of the at least one offer group associated with the user.

Clause 12: The method of any of clauses 9-11, further comprising storing, with at least one processor and in at least one database, offer data associated with the at least one offer that is input by at least one third party merchant, wherein step (b) comprises associating the user with an offer group for the at least one offer based on the transaction history profile of the user, and wherein the offer-determinative user data further comprises the offer data.

Clause 13: The method of any of clauses 9-12, wherein the offer data comprises a location of the at least one third party merchant, and wherein step (b) is based at least partly on a location of the ATM with respect to the location of the at least one third party merchant.

Clause 14: The method of any of clauses 9-13, wherein the at least one offer is an offer for the user to purchase a good or service from the at least one third party merchant for a transaction amount, the method further comprising, in response to an acceptance of the at least one offer by the user, receiving, with at least one processor, a transaction authorization request from the ATM or the acquirer to debit a transaction account of the user and credit a transaction account of the at least one third party merchant.

Clause 15: A system for dynamic promotional offers during user interaction at an automated teller machine (ATM), the system comprising a server comprising at least one processor, the server being programmed and/or configured to: (a) receive transaction data associated with a plurality of transactions between a plurality of users and a plurality of merchant point-of-sale terminals during a sample time period; (b) associate, based at least partly on the transaction data and using a user classification model, each user of the plurality of users with at least one offer group; (c) generate, based at least partly on the transaction data, a transaction history profile for each user of the plurality of users comprising a plurality of attributes associated with transactions completed by the user during the sample time period; (d) receive a request from the ATM or an acquirer associated with the ATM for offer-determinative user data, the request comprising an account identifier associated with a user of the plurality of users that is interacting with the ATM; (e) embed the offer-determinative user data associated with the user in an authorization response message based on a transaction request from the user interacting with the ATM; and (f) communicate the authorization response message to the ATM or the acquirer, the authorization response message configured to cause the ATM to display at least one offer to the user for acceptance or rejection of the at least one offer at the ATM.

Clause 16: The system of clause 15, wherein the request from the ATM or the acquirer is a custom user data request, and the offer-determinative user data comprises at least one user attribute of the transaction history profile of the user.

Clause 17: The system of clause 15 or 16, wherein the request from the ATM or the acquirer is a general user data request, and the offer-determinative user data comprises an offer group of the at least one offer group associated with the user.

Clause 18: The system of any of clauses 15-17, wherein the server is further programmed and/or configured to store, in at least one database, offer data associated with the at least one offer that is input by at least one third party merchant, wherein step (b) comprises associating the user with an offer group for the at least one offer based on the transaction history profile of the user, and wherein the offer-determinative user data further comprises the offer data.

Clause 19: The system of any of clauses 15-18, wherein the offer data comprises a location of the at least one third party merchant, and wherein step (b) is based at least partly on a location of the ATM with respect to the location of the at least one third party merchant.

Clause 20: The system of any of clauses 15-19, wherein the at least one offer is an offer for the user to purchase a good or service from the at least one third party merchant for a transaction amount, the system being further programmed and/or configured to, in response to an acceptance of the at least one offer by the user, receive a transaction authorization request from the ATM or the acquirer to debit a transaction account of the user and credit a transaction account of the at least one third party merchant.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1:
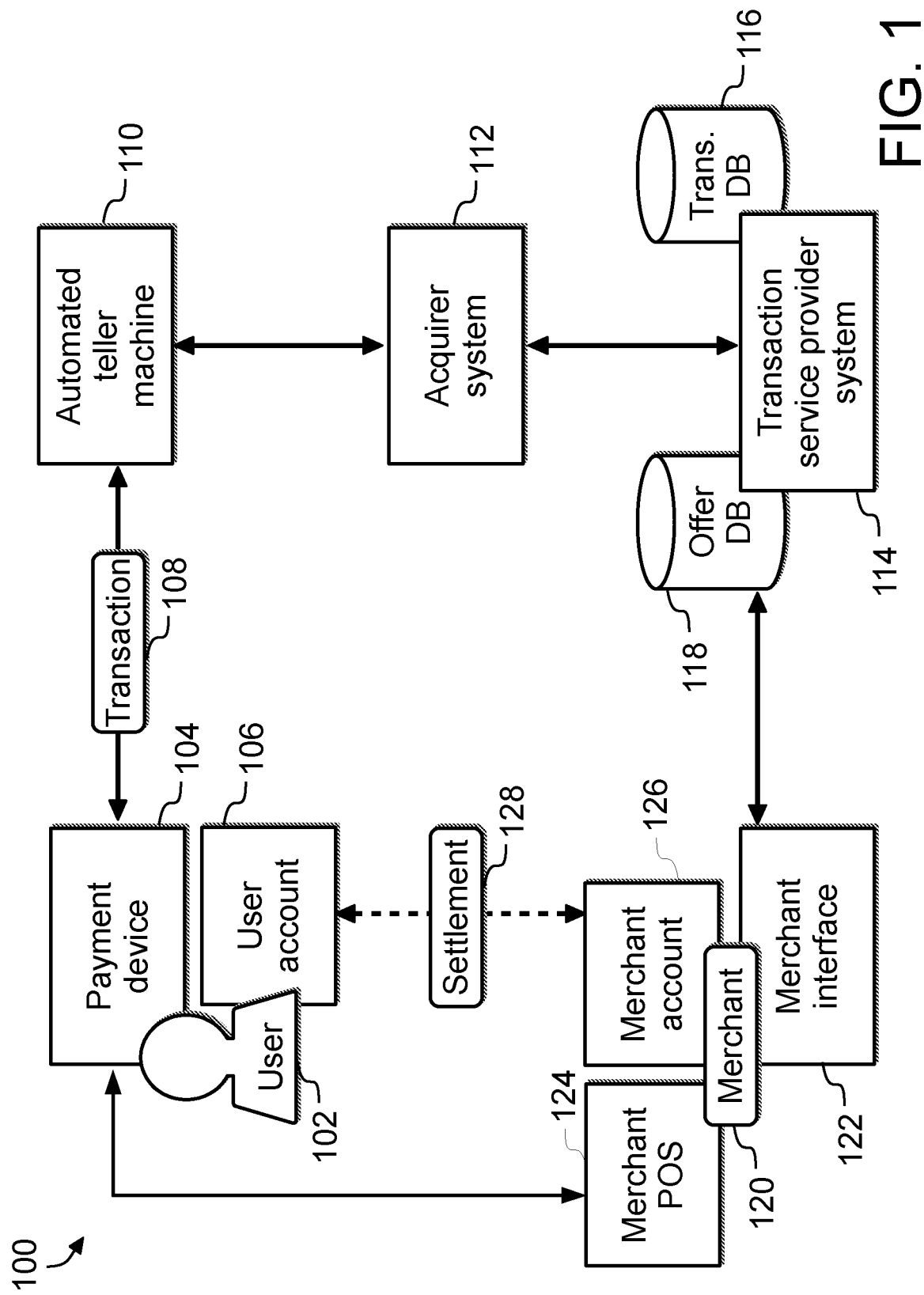
FIG. 1 is a schematic diagram of one embodiment or aspect of a system for dynamic promotional offers during user interaction at an ATM.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the illustrated embodiments are not to be interpreted as limiting and may assume various alternative variations and step sequences, except where expressly specified to the contrary. It is also to be understood that the specific devices and processes illustrated in the attached drawings, and described in the following specification, are simply exemplary embodiments or aspects of the present disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments are described herein in connection with thresholds. As used herein, satisfying a threshold may refer to a value being greater than, greater than or equal to, less than, less than or equal to, or equal to the threshold.

As used herein, the term "communicate" may refer to the reception, receipt, transmission, transfer, provision, and/or the like of information (e.g., data, signals, messages, instructions, commands, and/or the like). As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. As another example, a first unit may communicate with a second unit if an intermediary unit (e.g., a third unit located between the first unit and the second unit) receives information from the first unit, processes the information received from the first unit to produce processed information, and communicates the processed information to the second unit. In some non-limiting embodiments, a message may refer to a packet (e.g., a data packet, a network packet, and/or the like) that includes data.

As used herein, the term "transaction service provider" may refer to an entity that receives transaction authorization requests from merchants or other entities and provides guarantees of payment, in some cases through an agreement between the transaction service provider and an issuer. For example, a transaction service provider may include a payment network, such as Visa®, MasterCard®, American Express®, or any other entity that processes transactions. As used herein "transaction service provider system" may refer to one or more systems operated by or operated on behalf of a transaction service provider, such as a transaction service provider system executing one or more software applications associated with the transaction service provider. In some non-limiting embodiments, a transaction service provider system may include one or more servers operated by or operated on behalf of a transaction service provider.

As used herein, the term "issuer" may refer to one or more entities that provide one or more accounts (e.g., a credit account, a debit account, a credit card account, a debit card account, and/or the like) to a user (e.g., customer, consumer, and/or the like) for conducting transactions (e.g., payment transactions). For example, an issuer may provide an account identifier, such as a personal account number (PAN), to a user that uniquely identifies one or more accounts associated with the user. The account identifier may be used by the user to conduct a payment transaction. In some non-limiting embodiments, an issuer may be associated with a bank identification number (BIN) that uniquely identifies the issuer. As used herein "issuer system" may refer to one or more systems operated by or operated on behalf of an issuer. For example, an issuer system may refer to a server executing one or more software applications associated with the issuer. In some non-limiting embodiments, an issuer system may include one or more servers (e.g., one or more authorization servers) for authorizing a payment transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. The terms "point-of-sale system," "POS system," or "POS terminal," as used herein, may refer to one or more computers and/or peripheral devices used by a merchant to engage in payment transactions with customers, including one or more card readers, near-field communication (NFC) receivers, radio-frequency identification (RFID) receivers, and/or other contactless transceivers or receivers, contact-based receivers, payment terminals, computers, servers, input devices, and/or other like devices that can be used to initiate a payment transaction. A POS terminal may be located proximal to a user, such as at a physical store location, or a POS terminal may be remote from the user, such as a server interacting with a user browsing on their personal computer. POS terminals may include mobile devices.

As used herein, the term "account identifier" may refer to one or more types of identifiers associated with an account (e.g., a unique identifier of an account, an account number, a PAN, a card number, a payment card number, a token, and/or the like) of a user. In some non-limiting embodiments, an issuer may provide an account identifier to a user that uniquely identifies one or more accounts associated with that user. In some non-limiting embodiments, an account identifier may be embodied on a payment device (e.g., a payment card, a credit card, a debit card, and/or the like) and/or may be electronic information communicated to the user that the user may use for electronic payment transactions. In some non-limiting embodiments, an account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten by the user, stolen from the user, and/or the like, a supplemental account identifier may be provided to the user. In some non-limiting embodiments, an account identifier may be directly or indirectly associated with an issuer such that an account identifier may be a token that maps to a PAN or other type of identifier. Account identifiers may be alphanumeric, any combination of characters and/or symbols, and/or the like.

As used herein, the term "computing device" may refer to one or more electronic devices that include one or more processors. A computing device may be a stationary computer or a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also include components to send, receive, and/or process data, such as but not limited to memory, a display device, an input device, a network interface, and/or the like.

As used herein, the term "payment device" may refer to an electronic payment device, a portable financial device, a payment card, such as a credit card, a debit card, a charge card, a gift card, a payroll card, and/or the like, associated with an account identifier of a payment account. In some non-limiting embodiments, a payment device may include an electronic payment device, such as a smartcard, a chip card, integrated circuit card, and/or the like. An electronic payment device may include an embedded integrated circuit and the embedded integrated circuit may include a data storage medium (e.g., volatile and/or non-volatile memory) to store information associated with the payment device, such as an account identifier, a name of the account holder, and/or the like.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more devices, such as one or more processors, servers, and computing devices that include software applications, and/or the like.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a point-of-sale (POS) system, and/or any other device or system capable of communicating with a network. A client device may further include a desktop computer, laptop computer, mobile computer (e.g., smartphone), a wearable computer (e.g., a watch, pair of glasses, lens, clothing, and/or the like), a cellular phone, a network-enabled appliance (e.g., a network-enabled television, refrigerator, thermostat, and/or the like), a POS system, and/or any other device, system, and/or software application configured to communicate with a remote device or system.

ATM acquirers are typically unable to leverage "off-us" ATM transactions to solicit new customers or generate additional revenue beyond the income earned from ATM transaction fees (e.g., ATM access fee, interchange fees, foreign fees, etc.) charged to issuers and ATM users. Such fees may not cover expenditures for ATM maintenance and transaction processing, nor are they substantial revenue or representative of recurring business. ATM acquirers that attempt to provide non-targeted offers (e.g., advertisements, discounts, rewards, promotions, etc.) to ATM users engaging in off-us ATM transactions often fail, because of the lack of information about the ATM user. ATM acquirers may lack the data, analytics, and insight for an ATM user's payment device and expenditure pattern, and as a result, ATM acquirers cannot provide targeted or relevant offers that would capture the ATM user's interest. Thus, in the scenario of off-us ATM transaction processing, ATM acquirers fail to convert exclusive customer touch-point opportunities for the ATM user, while the ATM user is transacting at the ATM, into an actual sale or new customer acquisition. The disclosure herein provides technical solutions to bridge the off-us ATM transaction gap.

Non-limiting embodiments or aspects of the present disclosure are directed to a system and method for providing dynamic promotional offers during user interaction at an automated teller machine (ATM). The technical solutions described herein provide new ATM functionality through a communication channel to a transaction service provider system or other third party system capable of tracking and analyzing transaction data. Interoperability is improved by allowing acquirers to specify and receive the type of user data needed, piggy-backing on existing communications frameworks for processing ATM transactions. Previously existing exchanges of transaction authorization requests and transaction authorization responses may be augmented through embedded data, allowing ATM acquirers to request and receive offer-determinative user data, respectively. "Offer-determinative user data," as used herein, refers to data that may be used to determine an offer to present to a user, and such data may include offer data, data specific to the user, data specific to the user's offer group, data generic to all users, and/or the like. Machine-learning models may increase the success rate of presented offers and may provide various levels of offer targeting, including targeting offers by offer group (e.g., a group of one or more users 102 that share an attribute for targeting a specific offer or type of offer), location, individual, and/or the like. Moreover, because of the unique position of a transaction service provider system to track user transactional data and operate at the intersection of numerous transactional computer networks, merchants can interface with the transaction service provider system to specify offers to be disseminated to receptive users via ATM acquirers. Data of subsequent user transactions, which may constitute acceptance/rejection of offers, may be cycled into the machine-learning models from one time period to another to allow for feedback loops to create better targeted offers.

The described system and method may build data analytics models using machine learning algorithms to predict a user's needs and derive valuable insights into a user's spending patterns, purchase patterns, purchase preferences, preferred merchants, etc., using transactional data and external data such as travel data, social network data, point-of-sale (POS) data, and more. Equipped with such information from the data analytics model, ATM acquirers can present targeted offers to off-us ATM users transacting at their ATM. Building on the data analytics and machine-learning models, ATM acquirers can implement various strategies to maximize their revenues through approaches such as partnerships with merchants to provide offers, marketing and selling acquirer products to users to acquire them as customers, motivating users to choose the acquirer's ATMs over others to increase fee income, and/or the like. Moreover, customers benefit by having access to offers that they would otherwise miss by not transacting with their payment device issuer's ATMs.

The described system and method allow acquirers to generate additional revenue through sales, new customer acquisition, and increased fee income with the ability to acquire more off-us ATM transactions. Acquirers can use the disclosed system and method instead of self-implementing complex systems for targeted offers, usage rewards, and loyalty programs. Users benefit by receiving access to several relevant and targeted offers at any ATM without the need to visit a payment device issuer's ATM or bank branch. Transaction processing service providers benefit with more acquirers subscribing to the disclosed service. Transaction processing service providers can motivate acquirers to route off-us ATM transactions to their processing service, strengthen their hold in existing markets, and foray into new territories. With the flexibility of an application programming interface (API) call framework, the transaction processing service provider can compete with incumbent domestic players by offering this value-added service even when transactions are not routed to them for processing. Merchants benefit with increased visibility about their offers to a customer segment that primarily transacts at ATMs and uses debit cards. Merchants may not have the same level of offer awareness as for credit card users frequently purchasing at physical points-of-sale (POS) or online.

With specific reference to FIG. 1, and in non-limiting embodiments or aspects, provided is a system 100 for dynamic promotional offers during user interaction at an ATM. A user 102 may have a payment device 104 that is associated with a user account 106 of an issuer, and the user 102 may use the payment device 104 to complete various transactions, e.g., making purchases, completing ATM withdrawals, viewing statement balances, conducting account transfers, and/or the like. The user 102 may also use the payment device 104 to complete an ATM transaction 108 with an ATM 110. The ATM 110 is provided by an acquirer that has an acquirer system 112 for processing transactions 108 with the ATM 110. The acquirer system 112 may include one or more processors executing computer-readable instructions, and the acquirer system 112 may be partially or completely included in the ATM 110.

The system 100 may further include a transaction service provider system 114 that is communicatively connected to a transaction database 116 and an offer database 118. The transaction database 116 may be used for storing data associated with transactions completed between users 102 and merchants 120, ATMs 110, and/or the like. Transaction data of the transaction database 116 may be used by machine-learning models to generate one or more offer groups (e.g., a group of one or more users 102 that share an attribute for targeting a specific offer or type of offer) for a user 102, and/or to determine user 102 preferences, purchase patterns, location, and other offer-determinative user data. The offer database 118 may be used to store data of one or more offers (e.g., advertisements, discounts, rewards, promotions, etc.) to be presented to users 102. The offer database 118 may be accessed by the transaction service provider system 114 and/or the acquirer system 112. Furthermore, the transaction service provider system 114 and acquirer system 112 may have access to separate offer databases 118. A merchant 120 may provide offer data via a merchant interface 122 (e.g., a web portal, an application programming interface, etc.) having a communicative connection to one or more offer databases 118. Offer data may include, but is not limited to, offer date(s), offer time(s), offer limit count, offer acceptance criteria, offer fulfillment details, merchant name, offer location, contact information, and/or the like.

The merchant 120 may further be associated with a merchant POS system 124. Users 102 may use one or more payment devices 104 to complete transactions with merchants 120 via merchant POS systems 124. Users 102 may use the same or different payment device 104 for transacting with an ATM 110 and transacting with a merchant 120. When a user 102 transacts directly or indirectly with a merchant 120 to make a purchase of a good or service, a user account 106 of the user 102 may be debited and a merchant account 126 (e.g., a transaction account) of the merchant 120 may be credited for the amount of the purchase via a settlement 128 process. The transaction service provider system 114 may facilitate the settlement 128 process.

With further reference to FIG. 1, and in non-limiting embodiments or aspects, dynamic promotional offers may be presented during user 102 interaction at the ATM 110. The ATM 110 may receive a request to initiate a transaction 108 from user 102 input, and the transaction 108 may be based on an account identifier of a user 102. For example, the user 102 may have input their payment device 104, selected "withdrawal," entered a transaction amount, and initiated a request to withdraw the specified funds, thereby providing an account identifier (e.g., the payment device identifier, an account identifier corresponding to the user account 106, etc.). The ATM 110 and/or the acquirer system 112 may determine, based on the account identifier, that the user account 106 and/or payment device 104 were issued by an issuer that is different than an acquirer associated with the ATM 110. In response to determining that the user account 106 and/or payment device 104 were issued by a different entity, the ATM 110 and/or the acquirer system 112 may generate an authorization request message to a transaction service provider system 114 based on the transaction 108 request and the account identifier. For example, the authorization request message may identify the user account 106 using the account identifier or another identifier and may designate the type of transaction to be completed and for what amount, if applicable (e.g., a withdrawal authorization request).

With further reference to FIG. 1, and in non-limiting embodiments or aspects, the transaction service provider system 114 (or a computer system associated therewith, for all references herein to the transaction service provider system 114), may receive transaction data associated with a number of transactions between a number of users 102 and a number of merchants 120 over a time period (e.g., a week, a month, six months, a year, etc.). The transaction service provider system 114 may store the transaction data in a transaction database 116. The transaction service provider system 114 may associate users 102 with an offer group, based on the transaction data and a user classification model (e.g., a machine-learning classification model to assign users to offer groups). For example, historic transaction data may be used to train a machine-learning classification model to identify groups or patterns of users 102 based on parameters that can be used to target an offer including, but not limited to, offer cost, user 102 location, merchant 120 category, offer type (e.g., discount, reward, promotional purchase, etc.), time of day, user 102 age, user 102 gender, and/or the like. Some users may be associated with more than one offer group, and some users may be associated with no offer groups. Users may be associated with an offer group based on one or more attributes of their transaction history profile.

The transaction service provider system 114 may also generate, based on the transaction data, a transaction history profile for users 102. The transaction service provider system 114 may facilitate authorization, clearing, and/or settlement processes, and may collect transaction data of users 102. The collected data may be used to generate a transaction history profile for a given user 102. A transaction history profile of a user 102 may include one or more attributes associated with transactions completed by the user 102, particularly with a certain payment device 104 during a sample time period. Such attributes may include, but are not limited to, the following:

TABLE 1

| Attribute | Attribute Description |
| --- | --- |
| Payment Device Type | The type of payment device for which the transaction history profile is being requested. E.g., debit card, pre-paid card, ATM card, credit card, private label card, stored value card, fleet card, electronic wallet payment device, etc. |
| Purchase Propensity Classification - Transaction Service Provider | A transaction service provider classification, assigned to the user to identify the user's purchase propensity. This classification method would rank the user's "Spend Frequency" and "Spend Amount" attributes on a pre-defined scale, e.g., low to high, using base factors such as payment volume, transaction volume, and average ticket size. |
| Purchase Propensity Classification - Acquirer | An acquirer-defined classification, assigned to the user to identify the user's purchase propensity. This classification method would rank the user's "Spend Frequency" and "Spend Amount" attributes on a custom, pre-defined scale, e.g., low to high, using base factors such as payment volume, transaction volume, and average ticket size. The scale values may be customized per each acquirer's requirement. |
| Favored Payment Channel | The payment channel (e.g., ATM, physical POS, e-commerce, etc.) where the payment device's usage is higher than the transaction service provider's defined thresholds for that channel. E.g., a user's payment device usage in the e-commerce channel is 30% greater than the defined baseline value for the user's issuer country. Therefore, the favored payment channel for the user may be e-commerce. |
| New or Returning Customer | An indicator for a new or returning payment device user. E.g., for a new payment device user: the payment device has never before been used at the acquirer's location (e.g., ATM, physical POS location, online merchant site, etc.). E.g., for a returning payment device user: the payment device was used on one or more previous occasions at the same acquirer's location. |
| Traveler (Domestic/ International) | A flag to indicate if the payment device was used for any travel and accommodation-related payments during the review time frame. E.g., may return values such as either "domestic," "international," "both," or "none." |
| Fuel/Gas Purchases | A flag to indicate if the payment device was used for frequent fuel/gas purchases based on the transaction service provider's defined threshold values. E.g., if more than 3 fuel purchases per month, flag returns "true." |
| Restaurant Purchases | A flag to indicate frequent restaurant purchases on the payment device. Definition of frequent would be measured against the transaction service provider's defined threshold values. E.g., if more than 5 restaurant purchases per month, flag returns "true." |
| Scheduled/ Pre-planned Expenditures | A flag to indicate the presence of any scheduled or recurring payments for the payment device. E.g., may return true for video streaming service subscriptions, gym memberships, mortgage/rent payments, credit card payments, funds transfers, etc. |
| Payment Device Usage Frequency at ATM | A frequency of the payment device's usage at ATMs. E.g., daily, weekly, semimonthly, monthly, etc. |
| Total Transaction Volume at ATM | A total number of times the payment device was used at an ATM over a given frequency period. |
| Total Payment Volume at ATM | A total payment amount for the payment device at ATMs over a given frequency period. |

TABLE 1-continued

| Attribute | Attribute Description |
|---|---|
| Average Ticket Size at ATM | An average transaction amount per usage of the payment device at the ATM. |
| Favorite ATM | A name, address, and/or other identifier of a most visited ATM. |
| Favorite ATM Acquirer | An ATM acquirer name and/or other identifier where the payment device is most used. |
| Favorite Transaction Type at ATM | A type of ATM transaction completed most frequently using the payment device. E.g., cash withdrawal, funds transfer, bill payment, etc. |
| Payment Device Usage Frequency at POS | A frequency of payment device usage at a POS. E.g., daily, weekly, semimonthly, monthly, etc. |
| Total Transaction Volume at POS | A total number of times the payment device is used at a POS location over a given frequency period. |
| Total Payment Volume at POS | A total payment amount for which the payment device is used at POSs over a given frequency period. |
| Average Ticket Size at POS | An average transaction amount per usage of the payment device at a POS. |
| Favorite Merchant | A name, address, and/or other identifier of a most visited merchant. |
| Favorite Merchant Category | A merchant category where the payment device was most used. |
| Favorite Transaction Type at POS | A type of POS transaction done most often using the payment device. E.g., original credit, merchandise return, purchase with cashback, quasi-cash, etc. |
| Online Payment Device Usage Frequency | A frequency of payment device usage for online transactions. E.g., daily, weekly, semimonthly, monthly, etc. |
| Total Online Transaction Volume | A total number of times the payment device was used at an online POS over a given frequency period. |
| Total Online Payment Volume | A total payment amount for which the payment device is used at an online POS over a given frequency period. |
| Average Online Transaction Ticket Size | An average transaction amount per usage of the payment device at an online POS. |
| Favorite Online Merchant | A name, address, and/or other identifier of a most visited online merchant. |
| Favorite Online Merchant Category | A merchant category where the payment device was most used online. |
| Favorite Online Transaction Type | A type of online transaction completed most often using the payment device. E.g., purchase payment, funds transfer, bill payment |
| Cross-Border Transaction Exist | A flag indicating whether the payment device was used for any international or cross-border transactions within a predefined time frame. |
| Favorite Cross-Border Transaction | A type of transaction performed most at international or interstate-boundary locations. |
| Cross-Border Transaction Mode | A type of transaction mode for the cross-border transaction. E.g., ATM, physical POS, online, etc. |
| Cross-Border Transaction Volume | A total number of times the payment device is used for a cross-border transaction over a given frequency period. |
| Cross-Border Transaction Frequency | A total number of times the payment device is used internationally or at cross-border locations. E.g., daily, weekly, semimonthly, monthly, etc. |
| Cross-Border Transaction Average Ticket Size | An average transaction amount per international or cross-border usage of the payment device. |
| Favored Cross-Border Location | A location of a most frequented international or cross-border transaction location. E.g., acquirer's address, acquirer's country, acquirer's city, etc. |
| Transaction Service Provider Offers Available | A flag indicating whether any transaction service provider-hosted offers are applicable for the payment device and/or the acquirer processing the transaction. |

TABLE 1-continued

| Attribute | Attribute Description |
| --- | --- |
| Travel - Airline Data | An attribute that applies when "Traveler (Domestic/International)" attribute is true. This attribute may provide additional airline data about upcoming domestic or international travel for the payment device, as obtained from internal and/ or external data sources. E.g., travel dates, destination country/city, etc. |
| Travel - Hotel/ Accommodation Data | An attribute that applies when "Traveler (Domestic/International)" attribute is true. This attribute may provide additional data about any hotel/accommodation purchases on the payment device. |
| Travel - Car Rental Data | An attribute that applies when "Traveler (Domestic/International)" attribute is true. This attribute may provide additional data about car/vehicle rental purchases related to the travel. |
| Fuel/Gas Purchases Details | An attribute that applies when "Fuel/Gas Purchases" attribute is true. This attribute may provide additional data such as restaurant name/brand and location (e.g., city/zip) of the fuel/gas station where the payment device is most used. |
| Restaurant Purchase Details | An attribute that applies when "Restaurant Purchases" attribute is true. This attribute may provide additional data about the restaurant transactions. E.g., merchant name, location, average ticket size, transaction frequency, etc. |
| Recurring Spend Details | Provides additional data about any recurring spend patterns on the payment device. E.g., a user's ATM cash withdrawal transaction is typically followed by a POS transaction at a restaurant, a user's travel purchase transaction is typically followed by a cross-border ATM withdrawal transaction, etc. |
| Scheduled/ Pre-planned Expenditure Details | An attribute that applies when "Scheduled/ Pre-Planned Expenditures" attribute is true. This attribute may provide additional data about scheduled transactions. E.g., if a payment device has a gym membership payment scheduled each month, this attribute may provide additional details such as the merchant name, transaction amount, merchant location, etc. |
| Transaction Service Provider Offer Data | An attribute that applies when "Transaction Service Provider Offers Available" attribute is true. This attribute may provide complete data about the transaction service provider-hosted offers applicable to the payment device, acquirer, or any of the purchase profile attributes. Acquirers may opt to request data on some or all the applicable offers. E.g., a payment device may be eligible for a 5% cashback offer hosted by the transaction service provider. Also the user may be an international traveler and therefore eligible for a travel offer of mileage rewards, also offered by the transaction service provider. Subscriber may opt to fetch both or either offer details. |
| Transaction Service Provider Next Best Offer | An attribute that applies when "Transaction Service Provider Offers Available" attribute is true. This attribute may provide data about the most relevant transaction service provider offer applicable to the transaction history profile's various attributes. Subscribers may opt to receive the transaction service provider's identified next best offer for the payment device instead of self-identifying the best offer. |

With further reference to FIG. 1, and in non-limiting embodiments or aspects, the transaction service provider system 114 may receive a request from the ATM 110 for offer-determinative user data. The request may be associated with an authorization request message (e.g., as embedded data). The request also may be included in a separate communication (e.g., as an application programming interface (API) call). Furthermore, the request may also solicit the selection of an offer for the user. The request may be a custom user data request, e.g., a request for data that specifies one or more parameters for the type and/or amount of data received. A request for offer-determinative user data may be automatically identified as a custom user data request based on predefined custom business rules, thresholds, configurations, and/or the like, which may be provided by an acquirer when the acquirer is on-boarded to the system. The custom user data request may include a request of user data specific to the user 102 transacting with the ATM 110, which may be filtered by specific business rules, e.g., select data only related to a merchant type, select data only from a certain time period, select data only related to online transactions, etc. The offer-determinative user data may include, for a custom user data request, one or more user attributes from a transaction history profile of the user 102, a recommended offer for the user 102, and/or the like. Multiple custom user data requests may be communicated together or in sequence, such as in a number of request/response message exchanges. The request may also be a general user data request, e.g., a request for data without specifying parameters for the type and/or amount of data received. The general user data request may also include a request of an offer group of the user 102 or data of other users similarly situated to the user 102. The offer-determinative user data may include, for a general user data request, an offer group associated with the user 102, transaction history profile data of the user 102, an offer relevant to the offer group of the user 102, and/or the like.

The transaction service provider system 114 may communicate and associate the requested offer-determinative user data with an authorization response message (e.g., as embedded data). For example, the user 102 may be completing a deposit at the ATM 110. The ATM 110 and/or acquirer system 112 may communicate a deposit authorization request message to a transaction service provider system 114 for processing, and may embed therein a request for offer-determinative user data specific to the user 102 and related to fast food purchases, in the form of a custom user data request. The transaction service provider system 114 may then embed the requested offer-determinative user data in the authorization response message for the deposit. The requested data communicated by the transaction service provider system 114 may also include specific offer data or a type of offer that is relevant to the user 102 (e.g., likely to influence, interest the user 102). The ATM 110 and/or the acquirer system 112 may then receive an authorization response message including embedded user profile data (e.g., attributes of a transaction history profile, general offer data, offer data specific to the user 102, purchase trends, offer categories, and/or the like) that may be used, at least partially, to generate offers at the ATM 110. The ATM 110 may then display one or more offers based on the embedded user profile data. The authorization response message may be configured to cause the ATM 110 to present (e.g., display, audibilize, etc.) the offer to the user 102 for acceptance or rejection of the offer at the ATM 110, such as through a button press, screen press, voice command, and/or other sufficient interface control.

With further reference to FIG. 1, and in non-limiting embodiments or aspects, the offer may be an offer for the user 102 to purchase a good or service from one or more merchants 120 for a transaction amount. The offered purchase may be made later by the user 102 and may require redemption of a code/identifier provided by the offer. The offered purchase may also be made through acceptance by the user 102 at the ATM 110. For purchases at the ATM 110, the ATM 110 and/or acquirer system 112 may generate a transaction authorization request to debit a user account 106 of the user 102 and credit a merchant account 126 of the merchant 120. One or more offers selected for presentation at the ATM 110 may be determined by the ATM 110, the acquirer system 112, the transaction service provider system 114, or other third party system designated to identify relevant offers. For offers determined by the ATM 110 and/or acquirer system 112, the offer-determinative user data received from the transaction service provider system 114 may be used to aid selection of an offer(s) to display.

With further reference to FIG. 1, and in non-limiting embodiments or aspects, the transaction service provider system 114 or associated third party system may store offer data in the offer database 118 as input by the merchant 120 via the merchant interface 122. Offer data may include a location of the merchant 120, and users 102 may be associated with offer groups based on a location of the ATM 110 relative to a location of the merchant 120. For example, a user 102 may have visited, or may be presently interacting with, an ATM 110 located near merchant 120 that is looking to promote an offer. The user 102 may then be placed in an offer group that is based on the ATM 110 location, the associated merchant 120 location, or the specific offer.

Figure 2:
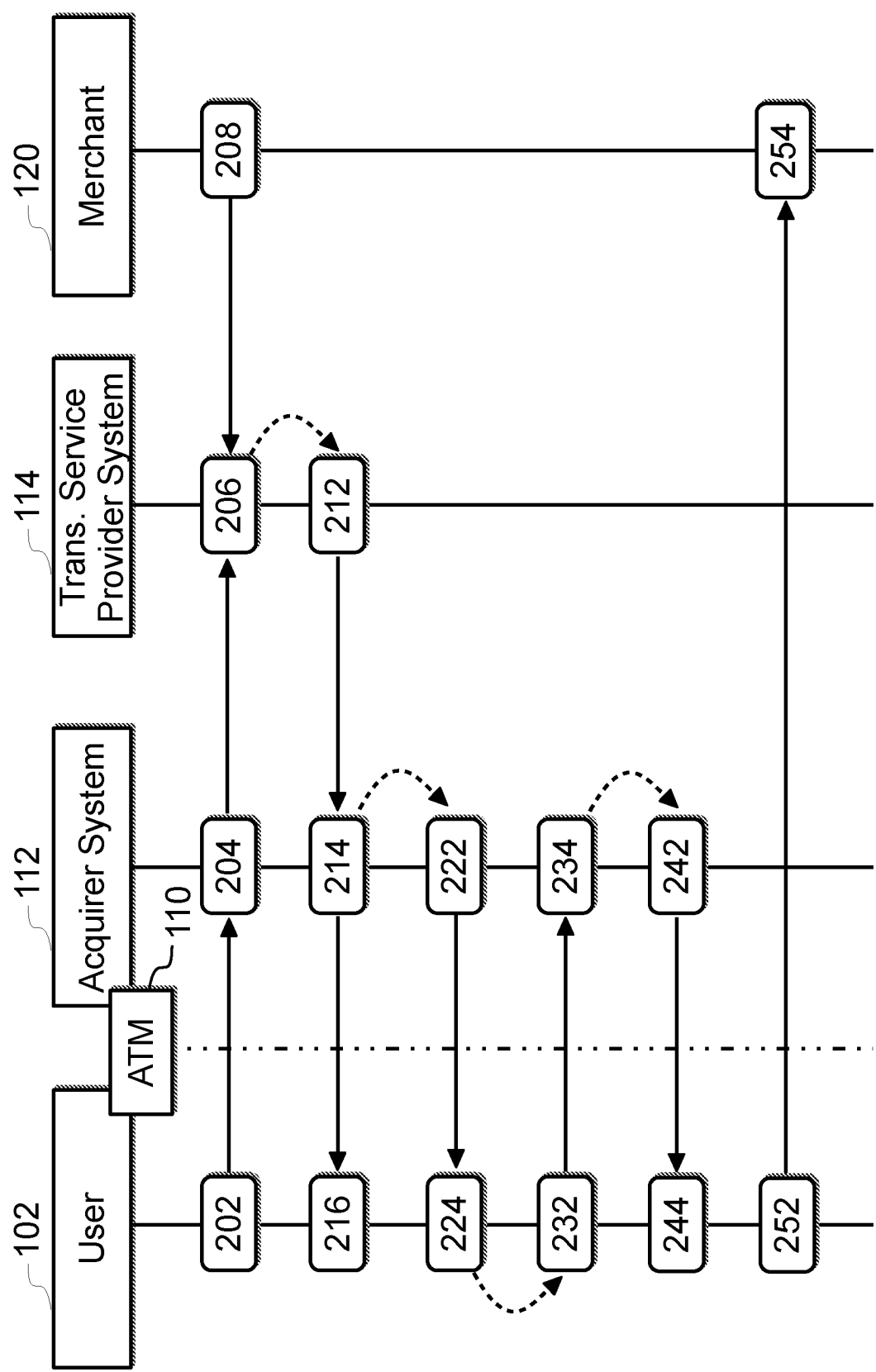
FIG. 2 is a process flow diagram of one embodiment or aspect of a system for dynamic promotional offers during user interaction at an ATM.

With specific reference to FIG. 2, and in non-limiting embodiments or aspects, provided is a process flow 200 of a system for providing dynamic promotional offers during user interaction at an ATM 110. At step 202, the user 102 initiates an off-us transaction at an ATM 110 of an acquirer system 112. The transaction is routed, at step 204, from the acquirer system 112 to a transaction service provider system 114, which includes an authorization transaction request and a request for offer-determinative user data. At step 206, the transaction service provider system 114 processes the authorization transaction request. At step 208, a merchant 120 inputs one or more offers, e.g., promotions, rewards, or loyalty programs, for storage in one or more offer databases accessible by the acquirer system 112 and/or the transaction service provider system 114. It will be appreciated that offers may be input at any time irrespective of when a user transacts at the ATM and independent of other steps.

At step 212, if the request for offer-determinative user data includes a general user data request, the transaction service provider system 114 may provide offer data and/or attributes of the user's transaction history profile without any customization or specification as to the types of offer data and/or attributes required. Therein, the transaction service provider system 114 may employ machine-learning models to generate one or more offer groups of the user 102. The transaction service provider system 114 may also provide general transaction history data of a broader set of users including the user 102. If the request for offer-determinative user data includes a custom user data request, at step 212, the transaction service provider system 114 may provide offer data and/or attributes of the user's transaction history profile with customization or specification as to the types of offer data and/or attributes required. The transaction service provider system 114 may employ machine-learning models to identify relevant attributes of the user's 102 transaction history profile, to identify suggested user offers, and/or the like. Custom user data requests may be defined by pre-configured business rules for the acquirer, which may be previously input by the acquirer. At step 214, the acquirer system 112 may receive the offer-determinative user data and, if an offer was not selected, generated, and/or the like by the transaction service provider system 114, the acquirer system 112 may itself select and/or generate an offer to present to the user 102.

At step 214, the acquirer system 112 and ATM 110 may complete the off-us transaction processing, which was initiated by the user 102 in step 202. In step 216, the user 102 may complete the user-side transaction process, such as by withdrawing cash, receiving a receipt, confirming deposit, and/or the like, depending on the initiated transaction. At step 222, the acquirer system 112, via the ATM 110, may present (e.g., display, audibilize, etc.) one or more offers to the user 102. At step 224, the user 102 may select one or more offers on the ATM 110, if desired, to accept and/or act on the offer. Accepted offers at the ATM 110 may trigger a transaction between the user 102 and an acquirer or a merchant 120. For offers that require the user 102 to input additional information (e.g., user 102 contact information), the acquirer system 112, via the ATM 110, may prompt the user 102 for the additional information at step 222. Additional information may include, but is not limited to, user 102 email, phone number, age, zip code, and/or the like. Additional information may be provided to confirm acceptance of an offer, trigger the provision of additional offer items, allow for future correspondence with the acquirer, allow for future correspondence with a merchant 120, and/or the like. At step 232, the user may input the requested additional information and/or interact with the ATM 110 to complete acceptance of the offer. Input user information may be received by the acquirer system 112 and/or ATM 110 in step 234.

At step 242, the acquirer system 112 and/or the ATM 110 may provide additional offer items to the user 102, in response to user 102 acceptance (including additional input information, if applicable), by printing a receipt, sending a user 102 email, texting a user's 102 phone number, and/or the like. Additional offer items may include, but are not limited to, coupons, promotional codes, QR codes, bar codes, cashback redemption instructions, payment devices (e.g., dispensed pre-paid cards, gift cards, etc.), tickets, and/or the like. Codes and the like may be printed by a printer of the ATM 110, may be shown on a display of the ATM 110, may be audiblized on a speaker of the ATM 110, and/or the like. Step 242 may include sending a communication from the acquirer system 112 to the merchant 120, using merchant contact information included in the offer-determinative user data and/or an offer database, to confirm to the merchant 120 that the user 102 has accepted the offer. At step 244, the user collects, receives, and/or the like any additional offer items and leaves the ATM 110. For offers that include purchases by the user 102 at a later time, not during user interaction with the ATM 110, the user 102 may, at step 252, complete a transaction with a merchant POS (e.g., a merchant 120 website, a physical store location, etc.). In step 252, the user 102 may additionally provide an identifier associated with an offer (e.g., a coupon identifier, a redemption code, a user identifier, etc.) at the merchant POS to redeem the offer previously provided at the ATM 110. At step 254, if an offer identifier was not provided, the merchant may validate the offer with the transaction service provider system 114 to provide the user 102 with the benefit of the offer, e.g., a discounted price, accumulated loyalty points, a shipped product, a provided service, and/or the like. At step 254, if an offer identifier was provided, the merchant may validate the redeemed offer and provide the benefit of the offer.

Figure 3:
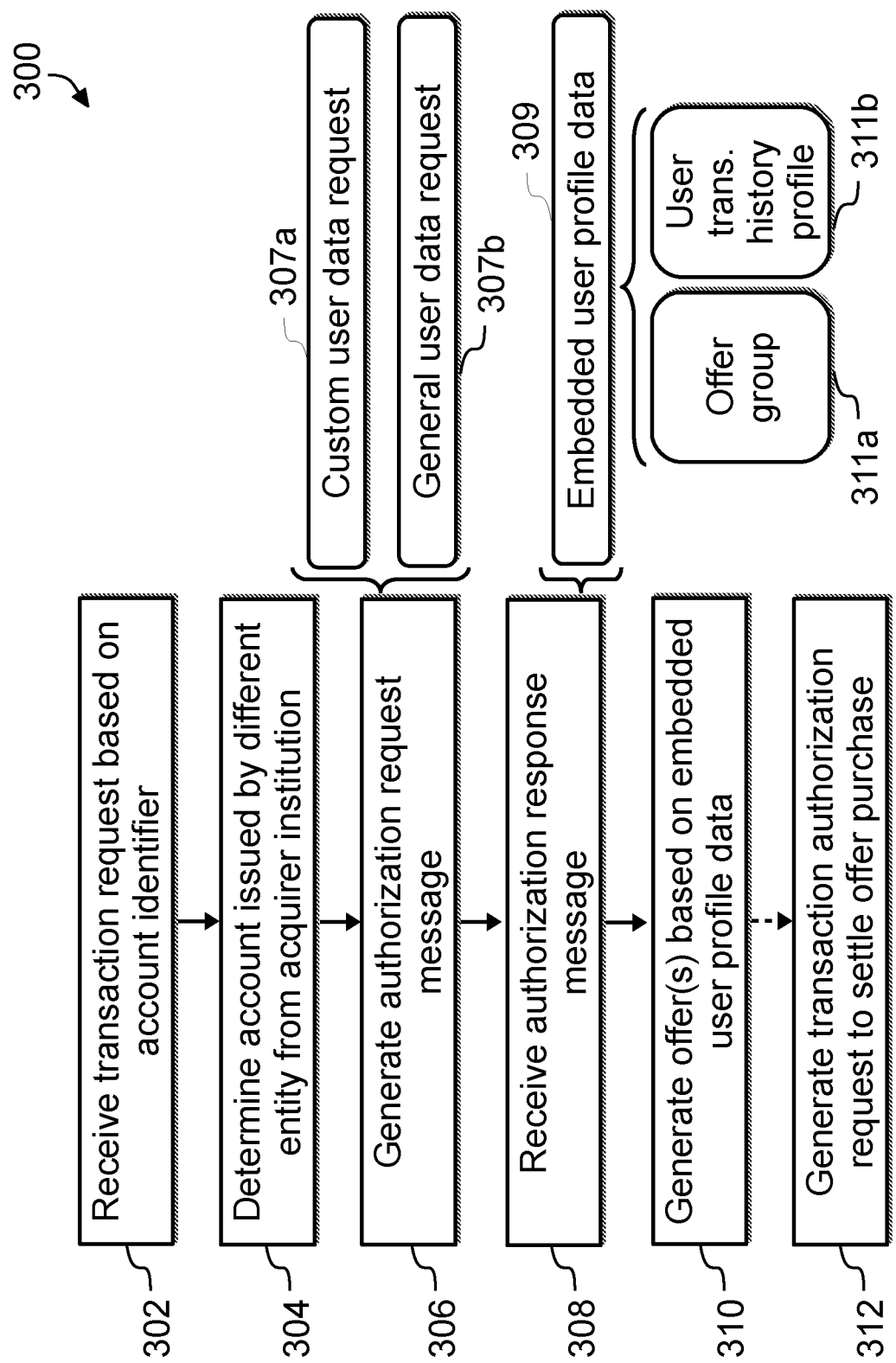
FIG. 3 is a process diagram of one embodiment or aspect of a system for dynamic promotional offers during user interaction at an ATM.

With specific reference to FIG. 3, and in non-limiting embodiments or aspects, provided is a method 300 of providing dynamic promotional offers during user interaction at an ATM 110. Any of the steps of method 300 may be carried out by an ATM, an acquirer system, and/or other processors. In step 302, an ATM receives a transaction request based on an account identifier associated with an account of a user. At step 304, the ATM and/or an associated acquirer system determines that the account of the user, based on the account identifier, was issued by an issuer that is different than an acquirer associated with the ATM. In step 306, in response to determining that the account was issued by a different issuer, the ATM and/or acquirer system generates an authorization request message to complete an ATM transaction based on the transaction request and the account identifier (e.g., to identify the user, the user's account, the user's payment device, etc.). The authorization request message may include a request for offer-determinative user data. The authorization request message may include a custom user data request 307a (e.g., specifying types of offer data or user attributes requested by the acquirer) or a general user data request 307b.

In step 308, the ATM and/or acquirer system may receive an authorization response message including embedded user profile data 309 (e.g., one or more attributes of a transaction history profile), which may include the requested offer-determinative user data. The embedded user profile data 309 may include an offer group 311a, at least a portion of a transaction history profile 311b of the ATM user, offer data, or other attributes for determining an offer to present to the ATM user. User profile data may be represented in the stream of transaction processing using pre-defined codes to be interpreted by ATM acquirers (e.g., weekly purchase frequency may be designated by code "001", average transaction amount may be designated by code "002," etc.). At step 310, the ATM may generate, on a display of the ATM, one or more offers based on the embedded user profile data. For offers that include an offer to complete a purchase with a merchant via the ATM, the method 300 may further include generating, at step 312 and in response to user acceptance, a transaction authorization request from the ATM to debit a transaction account of the user and credit a transaction account of a merchant.

Figure 4:
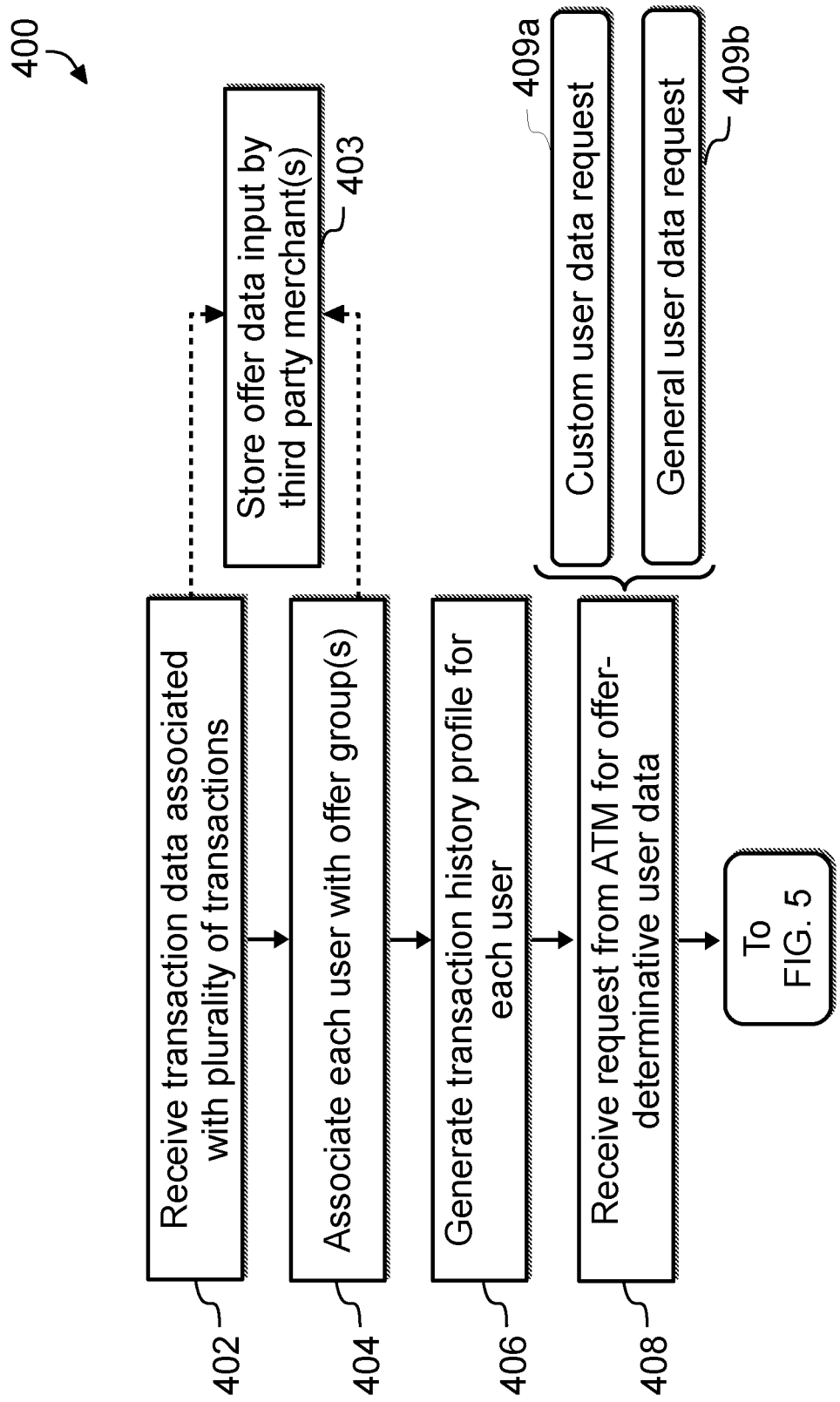
FIG. 4 is a process diagram of one embodiment or aspect of a system for dynamic promotional offers during user interaction at an ATM.

With specific reference to FIG. 4, and in non-limiting embodiments or aspects, provided is a method 400 of providing dynamic promotional offers during user interaction at an ATM 110. Any of the steps of method 400 may be carried out by a transaction service provider system and/or other processor communicatively connected thereto. In step 402, the transaction service provider system receives transaction data associated with a plurality of transactions between a plurality of users and a plurality of merchant point-of-sale terminals during a sample time period. In step 403, offer data input by third party merchants may be stored in an offer database, by the transaction service provider system and/or other processor. In step 404, the transaction service provider system 404 may associate each user, or some users, with an offer group. Step 404 may also be based on a location of the ATM (e.g., a location-based offer group including an area of or surrounding the ATM). The offer group may be based on one or more offers input by a merchant, or may be based on another attribute (e.g., users who frequently transact online). In step 406, the transaction service provider system may generate, based at least partly on the transaction data, a transaction history profile for each user including one or more attributes associated with transactions completed by the respective user during the sample time period.

In step 408, the transaction service provider system may receive a request from the ATM and/or an acquirer system associated therewith for offer-determinative user data. The request may include an account identifier (e.g., a PAN) associated with the user that is interacting with the ATM. The request may be a custom user data request 409a or a general user data request 409b. Based on the request, the transaction service provider system may retrieve user data, using the account identifier, from a user's transaction history profile for a pre-defined period (e.g., a week, a month, six months, a year, etc.), which may be a time period less than or equal to the time period for which all transaction data is recorded. For example, the transaction service provider may identify the user's purchase frequency (e.g., one per day), average transaction amount (e.g., $15), preferred purchase category (e.g., restaurants), and preferred merchant (e.g., from frequency of names of payment device acceptor/POS location, such as "Main Street Bakery"). If the transaction service provider system is configured to further identify an offer to present to the user, the transaction service provider system may apply a machine-learning model to offer data of an offer database to identify an offer relevant to the user's transaction history profile data. For example, the transaction service provider system may identify an offer for 10% off a purchase at "First Avenue Cupcakes," which may be a closest match to the above-exemplary user. The transaction service provider system may also provide suggested offers without communicating user data.

Figure 5:
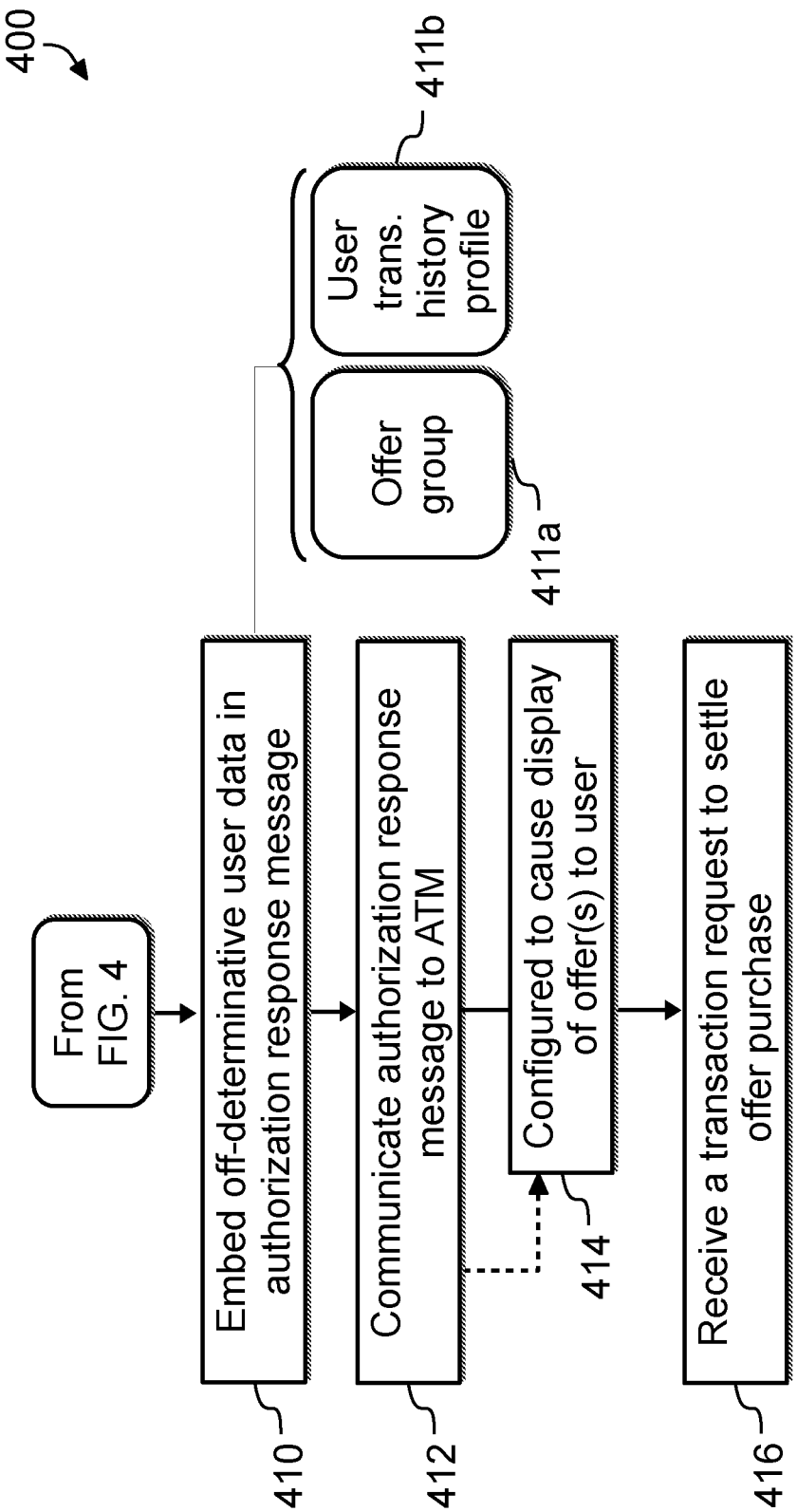
FIG. 5 is a process diagram of one embodiment or aspect of a system for dynamic promotional offers during user interaction at an ATM.

With specific reference to FIG. 5, and in non-limiting embodiments or aspects, provided is a continuation of a method 400 of providing dynamic promotional offers during user interaction at an ATM 110. Any of the steps of method 400 may be carried out by a transaction service provider system and/or other processor communicatively connected thereto. In step 410, the transaction service provider system may embed the offer-determinative user data in an authorization response message to the ATM and/or the acquirer system, based on the transaction request. Embedded data may include an offer group 411a of the user, offer data, transaction history profile data of the user 411b, and/or the like. For example, if the transaction request was for a withdrawal, the authorization response may be a corresponding withdrawal response (e.g., authorizing dispensing of money, denying withdrawal, etc.) and may include embedded data from the user's transaction history profile, e.g., the user's most common transaction type. In step 412, the transaction service provider system may communicate the authorization response message to the ATM and/or the acquirer system, and in step 414, the authorization response message may be configured to cause the ATM to display one or more offers to the user for acceptance or rejection of the offers at the ATM. If the offer-determinative user data itself includes offer data of an offer selected by the transaction service provider system, the ATM may or may not use the offer data to present the offer to the user, in addition to or instead of an offer chosen by the ATM acquirer system. If the offer-determinative user data does not include a transaction service provider system's selection of an offer, the acquirer system and/or ATM may determine an offer to present to the user by using the offer-determinative user data and communicating with an offer database to identify an offer for the user, in the same manner as a transaction service provider system might identify one or more recommended offers.

In step 416, the transaction service provider may receive a further transaction request to settle a purchase at the ATM from an accepted offer to purchase. In response to the user's acceptance of the offer to purchase a good or service from the acquirer or a third party merchant, the transaction service provider system may receive and process the transaction authorization request to debit a transaction account of the user and credit a transaction account of the acquirer or third party merchant.

With further reference to the foregoing figures, and in non-limiting embodiments or aspects, it will be appreciated that communications between the ATM 110 and/or ATM acquirer system 112 and the transaction service provider system 114 may also be completed by an application programming interface (API) call. For example, the ATM acquirer system 112 may make an API call to the transaction service provider system 114 to request the ATM user's 102 transaction history profile, and/or attributes thereof. The transaction service provider system 114 may then return at least a portion of the transaction history profile, which may include further detailed offer data. An API call may be preferred for ATM acquirer systems 112 that do not route transactions to the transaction service provider system 114 for processing, or for acquirers that are not traditional banking institutions or entities that deploy elaborate systems for offers. However, whether an ATM acquirer system 112 requests offer-determinative data in the context of transaction authorization process or in a separate API call, offer-determinative data may be provided to the ATM acquirer system 112 during user 102 interaction with the ATM 110, and an offer may be presented to the user 102 while the user 102 is interacting with the ATM 110. In such a manner, the user is provided relevant offer data in real-time with their ATM transaction 108 process, further enabling an on-ATM 110 offer acceptance process that would not be possible if the user 102 has completed their transaction and departed from the ATM 110.

To illustrate, a user 102 may perform an off-us ATM 110 transaction 108 using a payment device 104 at a convenience store (e.g., merchant 120) that provides a non-banking-institution (e.g., "white-label") ATM 110. The convenience store may also have an onsite gas station. The ATM acquirer system 112 may or may not route the authorization requests of the transaction 108 to the transaction service provider system 114 for processing, however, the ATM acquirer system 112 may make an API call to request offer-determinative data from the user's 102 transaction history profile. The request may be a custom user data request based on business rules of the acquirer, such as requesting user data related to gas-purchase transactions. The transaction service provider system 114 may determine that the user 102 purchases gas once a week, with an average transaction size of $30. The transaction service provider system may use an identifier of the ATM 110 to determine the ATM 110 location, which may further determine the convenience store merchant 120, which is associated with an onsite gas station. The transaction service provider may look up offers in an offer database related to the merchant 120 and identify an offer, such as a 10% cashback and $5 off the next gas purchase by the user 102 at the merchant 120 associated gas station. This information may be returned to the white-label ATM acquirer system 112, which then displays the offer details on the ATM 110 during completion of the user's 102 transaction 108, or thereafter. The user 102 may then accept the offer and use a displayed promotional code for the offer during a purchase at the gas station. The real-time targeted offers may increase the likelihood of the user 102 frequenting the convenience store and/or making purchases at the convenience store, and renders offers to a user 102 during a time frame when, and location where, the offers are relevant.

With further reference to the foregoing figures, and in non-limiting embodiments or aspects, the transaction service provider system 114 and/or the ATM acquirer system 112 may determine an offer for presentation to a user 102 at the ATM 110. In any case, a machine-learning model may be trained on historic transaction data, other rewards and loyalty program data, and/or external data to identify a best offer for the user 102. Best offers may be determined by identifying attributes of the user's 102 transaction history profile and/or of the ATM 110 itself and associating the attributes to parameters for an offer. For example, ATM 110 location information may be used to recommend offers for merchants in close proximity to the ATM 110. In another example, the transaction service provider system 114 may determine the user's 102 payment device 104 balance (e.g., current funds, credit limit, etc.) and determine a suitable offer based on affordability for the user 102. In another example, with cross-country or cross-state border off-us ATM 110 transactions 108, travel-related offers (e.g., discounts on transit, restaurants, hotels, etc.) may be recommended user 102.

It will be appreciated that the foregoing disclosure, which has been described in connection with off-us ATM transactions 108, may likewise be applied to on-acquirer ATM transactions 108, where the acquirer is also the issuer of the user's 102 payment device 104. Although, in such a scenario, the ATM acquirer system 112 would have access to an acquirer database of the user's 102 transaction history, the ATM acquirer system 112 may not be in a position to fully analyze or compare the present user 102 to the larger ecosystem of payment device 104 users 102. In any case, the ATM 110 and/or ATM acquirer system 112 may execute the steps of requesting offer-determinative data by communicating with the transaction service provider system 114 and receiving the offer-determinative data during processing of the user's 102 on-acquirer ATM transaction 108, and may likewise present offers to the user 102 during the user's 102 interaction with the ATM 110.

Although the disclosure has been described in detail for the purpose of illustration based on what is currently considered to be the most practical and non-limiting embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method for dynamic promotional offers during user interaction at an automated teller machine (ATM), the method comprising:

receiving, with at least one processor of a transaction service provider system, transaction data associated with a plurality of transactions between a plurality of users and a plurality of merchant point-of-sale terminals during a sample time period;

associating, with at least one processor of the transaction service provider system, based at least partly on the transaction data and using a user classification machine-learning model, each user of the plurality of users with at least one offer group;

generating, with at least one processor of the transaction service provider system, based at least partly on the transaction data, a transaction history profile for each user of the plurality of users comprising a plurality of attributes associated with transactions completed by the user during the sample time period;

receiving, with at least one processor of the transaction service provider system, a request from the ATM for offer-determinative user data, the request comprising an account identifier associated with a payment device of the user of the plurality of users that is interacting with the ATM, wherein the ATM is associated with an acquirer that is separate from an issuer of the payment device, and wherein the transaction service provider system is separate from the acquirer and the issuer;

embedding, with at least one processor of the transaction service provider system, the offer-determinative user data associated with the user in an authorization response message, wherein the authorization response message is based on a transaction request from the user interacting with the ATM, and wherein the offer-determinative user data comprises at least one attribute of the transaction history profile of the user, the at least one attribute comprising at least one of the following: a purchase propensity classification associated with a spend frequency and a spend amount of the user, a usage frequency of the payment device, data of a merchant category favored by the user, an average transaction amount per usage of the payment device, or any combination thereof;

communicating, with at least one processor of the transaction service provider system, the authorization response message to the ATM, wherein the authorization response message is configured to cause the ATM to display at least one offer to the user for acceptance or rejection of the at least one offer at the ATM, and wherein the at least one offer is an offer for the user to purchase a good or service from the at least one third party merchant for a transaction amount; and in response to an acceptance of the at least one offer by the user:

receiving, with at least one processor of the transaction service provider system, a transaction authorization request from the ATM to debit a transaction account of the user and credit a transaction account of the at least one third party merchant for the transaction amount;

updating, with at least one processor of the transaction service provider system, the user classification machine-learning model based on data associated with the acceptance of the at least one offer, to produce an updated user classification machine-learning model; and associating, with at least one processor of the transaction service provider system, at least one user of the plurality of users with at least one new offer group in a subsequent time period using the updated user classification machine-learning model.

2. The method of claim 1, wherein the request from the ATM is a custom user data request.

3. The method of claim 1, further comprising storing, with at least one processor of the transaction service provider system and in at least one database, offer data associated with the at least one offer that is input by the at least one third party merchant, and wherein associating each user of the plurality of users with the at least one offer group comprises:

associating, with at least one processor of the transaction service provider system, the user with an offer group for the at least one offer based on the transaction history profile of the user, wherein the offer-determinative user data further comprises the offer data.

4. The method of claim 3, wherein the offer data comprises a location of the at least one third party merchant, and wherein associating each user of the plurality of users with the at least one offer group comprises:

associating, with at least one processor of the transaction service provider system, each user of the plurality of users with the at least one offer group based at least partly on a location of the ATM with respect to the location of the at least one third party merchant.

5. A system for dynamic promotional offers during user interaction at an automated teller machine (ATM), the system comprising at least one processor of a transaction service provider system, the at least one processor being programmed and/or configured to:

receive transaction data associated with a plurality of transactions between a plurality of users and a plurality of merchant point-of-sale terminals during a sample time period;

associate, based at least partly on the transaction data and using a user classification machine-learning model, each user of the plurality of users with at least one offer group;

generate, based at least partly on the transaction data, a transaction history profile for each user of the plurality of users comprising a plurality of attributes associated with transactions completed by the user during the sample time period;

receive a request from the ATM for offer-determinative user data, the request comprising an account identifier associated with a payment device of a user of the plurality of users that is interacting with the ATM, wherein the ATM is associated with an acquirer that is separate from an issuer of the payment device, and wherein the transaction service provider system is separate from the acquirer and the issuer;

embed the offer-determinative user data associated with the user in an authorization response message, wherein the authorization response message is based on a transaction request from the user interacting with the ATM, and wherein the offer-determinative user data comprises at least one attribute of the transaction history profile of the user, the at least one attribute comprising at least one of the following: a purchase propensity classification associated with a spend frequency and a spend amount of the user, a usage frequency of the payment device, data of a merchant category favored by the user, an average transaction amount per usage of the payment device, or any combination thereof;

communicate the authorization response message to the ATM, wherein the authorization response message is configured to cause the ATM to display at least one offer to the user for acceptance or rejection of the at least one offer at the ATM, and wherein the at least one offer is an offer for the user to purchase a good or service from the at least one third party merchant for a transaction amount; and in response to an acceptance of the at least one offer by the user:
receive a transaction authorization request from the ATM to debit a transaction account of the user and credit a transaction account of the at least one third party merchant for the transaction amount;

update the user classification machine-learning model based on data associated with the acceptance of the at least one offer, to produce an updated user classification machine-learning model; and associate at least one user of the plurality of users with at least one new offer group in a subsequent time period using the updated user classification machine-learning model.

6. The system of claim 5, wherein the request from the ATM is a custom user data request.

7. The system of claim 5, wherein the at least one processor is further programmed and/or configured to store, in at least one database, offer data associated with the at least one offer that is input by the at least one third party merchant, and wherein while associating each user of the plurality of users with at least one offer group, the at least one processor is programmed and/or configured to:

associate the user with an offer group for the at least one offer based on the transaction history profile of the user, wherein the offer-determinative user data further comprises the offer data.

8. The system of claim 7, wherein the offer data comprises a location of the at least one third party merchant, and wherein, while associating each user of the plurality of users with the at least one offer group, the at least one processor is programmed and/or configured to:

associate each user of the plurality of users with the at least one offer group based at least partly on a location of the ATM with respect to the location of the at least one third party merchant.

* * * * *